Jan. 29, 1957  S. VORECH  2,779,314
COMBINED FLUID PRESSURE MOTOR AND VALVE MECHANISM
Filed Sept. 21, 1953
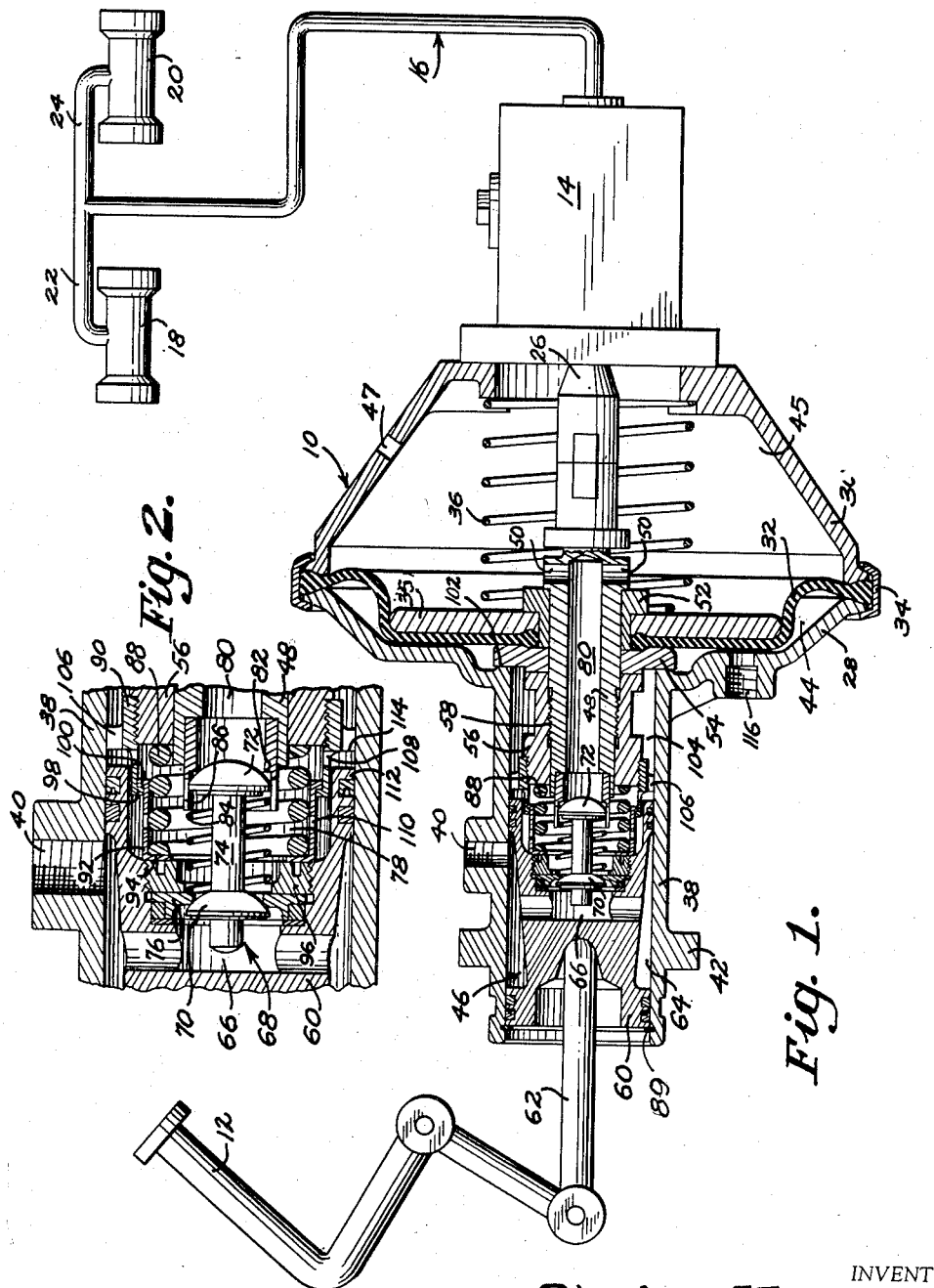
INVENTOR
Stephen Vorech
BY Scrivener & Parker
ATTORNEYS 2,779,314
Patented Jan. 29, 1957

2,779,314

COMBINED FLUID PRESSURE MOTOR AND VALVE MECHANISM

Stephen Vorech, Elyria, Ohio, assignor to Bendix-Westinghouse Automotive Air Brake Company, Elyria, Ohio, a corporation of Delaware Application September 21, 1953, Serial No. 381,389

4 Claims. (Cl. 121—41)

This invention relates to a fluid pressure actuating mechanism and more particularly to an actuator of the fluid pressure type which is particularly adapted for securing increased and readily controllable breaking pressures on vehicles equipped with brakes of the conventional hydraulically actuated type.

One of the objects of the present invention is to provide a novel and efficiently operable servo or booster actuator of the fluid pressure actuated type, which may be readily adapted for use in connection with present day hydraulic vehicle braking systems.

Another object is to provide in an actuator of the above type, a novel arrangement including a follow-up valve construction which is so constituted as to provide a reactive force which opposes manual operation of the actuator in proportion to the degree of fluid pressure energization of the actuator, such a construction enabling the operator to accurately feel the application of the vehicle brakes.

Still another object is to provide in a construction of the foregoing type, a novel arrangement whereby, upon initial operation of the control pedal or member, a predetermined degree of manual operation of the brakes or other actuated device may occur, prior to fluid pressure operation thereof, thus enabling a combined manual and power operation of the actuator to be secured throughout the range of operation thereof.

A further object resides in a novel combination of elements which offer the advantages of simplied construction, installation and repair, combined with ease of control which is secured by the use of follow-up valve action accompanied by reactive feel.

Still a further object resides in the novel combination of elements arranged so that in the event of a partial or complete failure of boost fluid pressure, normal operation of the vehicle brakes or other actuated device can be realized with no detrimental effects other than the requirement of additional physical effort.

The above and other objects of the invention will appear more fully hereinafter from a consideration of the following detailed description when taken in connection with the accompanying drawing which is illustrative of one form of the invention. It is to be expressly understood however, that the drawing is utilized for purposes of illustration only and is not to be taken as a definition of the limits of the invention, reference being had for this purpose to the appended claims.

Referring to the drawing, wherein similar reference characters refer to similar parts throughout the several views:

Fig. 1 is a side view, partly in section, of a compressed air controlled hydraulic braking system constructed in accordance with the principles of the present invention, and illustrating in detail the particular construction of the fluid pressure actuator and valve thereof; and Fig. 2 is an enlarged sectional view of a portion of the apparatus of Fig. 1 and illustrating the valve control for the power actuator.

Referring more particularly to Fig. 1, the present invention includes a compressed air operated servo motor or actuator 10 which is placed in series between a brake pedal 12 and a master cylinder 14 of a vehicle hydraulic braking system 16, the latter including a plurality of wheel cylinders 18 and 20 which are connected by hydraulic lines 22 and 24 with the master cylinder 14 in a conventional manner. As shown, the motor 10 is provided with an actuating rod 26 which is connected with the piston of the master cylinder 14 in any suitable manner, the construction of the motor 10 being such that the operation of the rod 26 and hence the master cylinder 14 may be precisely controlled in the same manner as if the pedal 12 were directly connected with the master cylinder, except for the fact that by the present invention, the movement of the master cylinder is effected by the power of compressed air supplemented by manual effort as will appear more fully hereinafter. The invention is also of such a nature that in the event of failure of the source of compressed air, the hydraulic braking system may be manually controlled in the same manner as if the motor 10 were not present. While Fig. 1 illustrates the invention in association with a vehicle hydraulic braking system, it will be appreciated that the invention is not limited to such use but is capable of operating any suitable type of structure where power operation thereof is desirable.

As will readily appear from Fig. 1, the novel servo motor or actuator 10 comprises a pair of housing portions 28 and 30 between which a suitable pressure responsive element in the form of a flexible diaphragm 32 is clamped as by means of a ring 34. Against the right hand face of the diaphragm 32 is a plate 35 and the latter and the element 32 are normally maintained in the inoperative position illustrated as by means of a spring 36 which is interposed between the plate 35 and the right hand end portion of the housing member 30. Integrally formed with or suitably secured to the housing member 28 is a stationary sleeve 38 which is provided with an inlet opening 40 for connection with a source of compressed air, not shown. The sleeve 38 is also provided with a suitable flange 42 so that the fluid actuator assembly may be suitably mounted upon a stationary portion of the vehicle or other mounting. It will be observed that the pressure responsive element 32 divides or forms with the housing member 28 and 30, a pair of spaces 44 and 45, the former constituting a pressure space to which compressed air is conducted and exhausted, and the latter constituting an atmospheric space or chamber which is constantly open to the atmosphere by way of an opening 47 in the member 30.

In order to control the application of compressed air to and from the pressure space 44, the servo motor 10 includes a valve mechanism 46 which is so constructed and arranged as to have a follow-up action and to also provide a reactive feel for the operator in order that the graduated application and release of the brakes or other actuated device may be readily effected. More particularly, such valve mechanism 46 includes a movable hollow sleeve 48 which communicates at all times with the atmospheric chamber 46 through ports 50 at its right hand end. Sleeve 48 is firmly secured to the pressure responsive member 32 as by means of a collar 52, a disk 54 and a sleeve 56 which is threadedly secured at 58 to the sleeve 48 and serves to maintain these parts in firm engagement with each other. Manually operable plunger 60 is slidably mounted within the stationary sleeve 38 and is adapted to be moved to the right, as viewed in Fig. 1, as by means of a plunger 62 connected with the pedal 12. Plunger 60 is cut away intermediate its end portions to provide a fluid balanced reciprocable fluid supply cavity 64 which is in constant communication with the inlet 40 as the plunger 60 moves within the cylinder 38, so that the communication between the inlet 40 and an inlet chamber 66, formed in the plunger 60, may be secured at all times. As shown, the opposite ends of the plunger 60 are provided with suitable seals to prevent leakage of fluid from cavity 64.

A novel valve construction is supported and carried by the plunger 60 in order to control the energization of the fluid motor 10 during operation of the pedal 12. As will be seen from Figs. 1 and 2, such valve mechanism includes an actuator valve device 68 comprising an inlet valve 70 and an exhaust valve 72, these being interconnected by a stem 74 to provide an integral valve assembly. Such inlet valve 70 cooperates with an inlet valve seat 76 carried by the plunger 60 and serves to control communication between the inlet chamber 66 and an outlet chamber 78, the latter chamber being formed between the right hand end of the plunger 60 and the left hand end of the sleeve 48. As has been heretofore pointed out, the sleeve 48 is hollow and thus provides an exhaust chamber 80 which is constantly connected with the atmospheric chamber 45. The left hand end portion of the sleeve 48 is provided with an exhaust valve seat 82 which cooperates with the exhaust valve 72 so that the latter controls communication between the exhaust chamber 80 and the outlet chamber 78. As shown, the valve assembly 68 is normally positioned so that the inlet valve 70 is closed and the exhaust valve 72 is open and the valve assembly is carried by and maintained in position with respect to the plunger 60 as by means of a spring 84. If desired, suitable guide fingers 86 may project outwardly from the exhaust valve seat 82 in order to provide a suitable guide for the exhaust valve 72.

In order to maintain the plunger 60 and the sleeve 48 in the relative positions shown in Figs. 1 and 2, when the the fluid motor 10 is not energized, a preloaded spring 88 is interposed between these parts and serves to normally move the plunger 60 into contact with a stop ring 89 carried by the outer left hand end portion of the sleeve 38. The degree of preloading of the spring 88 may be controlled as by means of a pair of cooperating preloading collars 90 and 92, the collar 90 being suitably threaded to the sleeve 56 and the collar 92 provided with an inwardly directed flange 94 which is interposed between the left hand end of the spring 88 and a collar 96 carried by the plunger 60. The opposite ends of the respective collars 90 and 92 are flanged at 98 and 100 respectively and such flanges are in engagement when the parts occupy the normal position shown in Figs. 1 and 2 so that the expansive force of the spring 88 is limited to a predetermined degree of preloading.

In the normal inoperative position of the device, the spring 36 urges the pressure responsive member 32 toward the left in order to bring the plate 54 to rest against a portion 102 of the housing member 28. Spring 88 is slightly stronger than spring 36 and serves to move the plunger 60 and valve mechanism 68 to the positions illustrated where the exhaust valve 72 is open and communication between the outlet chamber 78 and the exhaust chamber 80 is established. Communication is always established between the pressure space 44 and the outlet chamber 78 by way of the space 104 surrounding the sleeve 56, openings 106 and 108 in the collar 90, and openings 110 in the collar 92. In the normal position of the parts it is thus seen that the pressure space 44 communicates with the atmospheric space 45 of the fluid motor 10.

With the parts occupying the normal position referred to above, initial movement of the pedal 12 will serve to move the plunger 60 and the sleeve 48 to the right in order to effect a slight manual movement of the pressure responsive element 32 and the actuated device connected with the pushrod 26. This action is assured in view of the fact that the preloaded spring 88 is stronger than the return spring 36. Thus, some slight pressure will be built up in the master cylinder 14 or other actuated device upon such initial movement of the pedal 12. As soon as the resistance to manual movement of the pressure responsive element 32 exceeds the preloading of the spring 88, relative movement between the plunger 60 and the sleeve 48 will occur so that the exhaust valve 72 will contact its seat 82 in order to shut off communication between the pressure space 44 and the atmospheric space 45. Continued movement of the pedal 12 will move the inlet valve seat 76 away from the inlet valve 70 in order to establish communication between the outlet chamber 78 and the source of compressed air by way of the open inlet valve 70, the inlet chamber 66 and the inlet connection 40. Compressed air admitted to the outlet chamber 78 will thereupon be conducted to the pressure space 44 past the openings 110, 108, 106 and the space 104 as heretofore set forth in detail. The pressure responsive element 32 will thereupon be moved to the right in response to the compressed air delivered to the pressure space 44 and if no further movement of the pedal 12 occurs, the movement of the element 32 and the sleeve 48 will serve to effect a closing movement of the inlet valve 70 in response to the action of the valve spring 84. When this occurs, the follow-up valve action of the valve mechanism takes place and the pressure in the space 44 will be maintained.

It will be observed from the above that as soon as compressed air is admitted to the outlet chamber 78, it will react against the right hand face of the plunger 60 in order to provide a reactive feel for the operator. If it should be desired to supply additional compressed air to the fluid actuator 10, the pedal 12 is depressed a further distance and against the pressure feel referred to above in order to again move the inlet valve seat 76 away from the inlet valve 70. Additional compressed air will thereupon be conducted to the pressure space 44 in the manner heretofore set forth and should the pedal movement 12 be arrested, the valve mechanism will follow up and lap in response to movement of the pressure responsive element 32 and the sleeve 48 connected therewith. Thus during operation of the invention, initial movement of the pedal 12 serves to first, manually move the element 32 and parts connected thereto a slight distance determined by the preloading of the spring 88. Thereafter, and when the resistance to operation of the actuator device exceeds the preloading of the spring 88, compressed air operation of the fluid motor 10 will take place in a manner such that a follow-up action is secured and a highly desirable reactionary feel will be achieved.

It will be noted that the right hand end portion 112 of the plunger 60 and the left hand end portion 114 of the collar 90 are spaced but a slight distance apart. This spacing enables these elements to contact each other and be moved as a unit in the event of failure of the source of compressed air. Thus, when such a failure occurs, it is only necessary to move the pedal 12 so that the plunger 60 contacts the collar 90, the latter being connected to the sleeve 56 which in turn is carried by the sleeve 48. In this manner, manual operation of the element 32 and parts connected thereto is assured even in the absence of compressed air.

There has thus been provided by the present invention a novel and materially simplified fluid pressure actuator which is especialy adapted for but not limited to use in connection with vehicle hydraulic braking systems. The installation of the invention may be readily and quickly effected with respect to present day hydraulic braking systems, it being only necessary to associate the fluid pressure actuator 10 with the master piston of the master cylinder 14. The novel valve mechanism herein disclosed is relatively simple in its construction and is yet highly efficient in operation and serves to effectively graduate the application of compressed air to the fluid motor. At the same time, the valve mechanism is so arranged as to secure a follow-up action during its operation and also achieves the highly desired reaction or feel for the operator. If it is desired to utilize the invention to operate tractor brakes and to also operate air brakes on a trailer, the braking system on the trailer may be connected with the pressure space 44 through opening 116. Otherwise, the opening 116 is closed by a suitable plug.

While one embodiment of the invention has been shown herein and described with considerable particularity it will be understood by those skilled in the art that the invention is not limited to the form shown but may be embodied in a variety of expressions. Reference will therefore be had to the appended claims for a definition of the limits of the invention.

What is claimed is:

1. A fluid pressure actuator comprising a housing having a pressure responsive member therein, said member defining with said housing, a pressure chamber at one side of said chamber and an atmospheric chamber at the opposite side of said member, a stationary sleeve connected with the housing, and means for controlling the flow of compressed air to and from the pressure chamber and for manually moving said pressure responsive member, comprising a follow-up valve device including a movable sleeve connected with said member and provided with a passage therethrough, an inlet valve for connecting said pressure chamber with a source of compressed air, an exhaust valve rigidly connected with the inlet valve, a manually movable valve operating member slidably mounted in the stationary sleeve and provided with an inlet valve seat for the inlet valve, resilient means interposed between said valve operating member and the exhaust valve for normally maintaining said inlet valve closed on its seat, one end of said movable sleeve being formed with an exhaust valve seat for the exhaust valve and the passage of said movable sleeve communicating at all times with said atmospheric chamber, resilient means interposed between said valve operating member and said movable sleeve for normally maintaining the exhaust valve spaced from the exhaust valve seat, means for preloading the last named resilient means comprising a pair of interconnected relatively movable collars, one of said collars being connected with the movable sleeve and the other collar being connected with the valve operating member, and means for mechanically connecting the valve operating member with the movable sleeve to manually move said sleeve and the pressure responsive member after a predetermined amount of sliding movement of said valve operating member relative to said movable sleeve has occurred.

2. A fluid pressure actuator comprising a housing having a pressure responsive member therein, said member defining with said housing, a pressure chamber at one side of said member and an atmospheric chamber at the opposite side of said member, a spring in said atmospheric chamber tending to move said member in one direction, a stationary sleeve connected with the housing, and means for controlling the flow of compressed air to and from the pressure chamber and for manually moving said pressure responsive member in the opposite direction, comprising a follow-up valve device including a hollow movable sleeve connected with said member and extending into said stationary sleeve, one end of said movable sleeve providing an exhaust valve seat and the interior of the movable sleeve communicating at all times with said atmospheric chamber, a manually operable member slidably mounted in said stationary sleeve and having an inlet chamber communicating at all times with a source of compressed air and also having an inlet valve seat, said one end of the movable sleeve and the manually operable member being spaced from each other to provide an outlet chamber, a unitary valve assembly comprising interconnected inlet and exhaust valves, the inlet valve being positioned in said inlet chamber for cooperation with said inlet valve seat and the exhaust valve being positioned in said outlet chamber for cooperation with said exhaust valve seat, means for supporting said valve assembly for movement with said manually operable member comprising a spring interposed between the last named member and said exhaust valve, said spring acting in a direction to normally close the inlet valve upon its seat to interrupt communication between the inlet and outlet chambers, resilient means interposed between the movable sleeve and the manually operable member for normally maintaining the exhaust valve spaced from the exhaust valve seat to connect the outlet chamber with the atmospheric chamber, said resilient means being preloaded to a degree greater than the strength of said first named spring, means connecting the outlet chamber with the pressure chamber, and means for mechanically connecting the manually operable member with the movable sleeve to manually move said sleeve and the pressure responsive member after a predetermined amount of relative movement between the manually operable member and the movable sleeve has occurred.

3. A fluid pressure actuator comprising a housing having a pressure responsive element therein and defining with said housing, a pressure chamber and an atmospheric chamber, a spring in said atmospheric chamber tending to move said member in one direction, a stationary sleeve connected with said housing, and means within said sleeve for controlling the flow of compressed air to and from the pressure chamber, comprising a pair of spaced apart members defining an outlet chamber therebetween connected with said pressure chamber, one of said members being connected with the pressure responsive element and having an exhaust chamber in communication at all times with said atmospheric chamber, the other member being manually operable and having an inlet chamber in communication at all times with a source of compressed air, a unitary valve assembly carried by the last named member and including a normally closed inlet valve for controlling communication between the inlet and outlet chambers and including also, a normally open exhaust valve for controlling communication between the outlet and exhaust chambers, resilient means interposed between said members for normally separating said members a predetermined distance apart for normally maintaining said exhaust valve open, and means for preloading said resilient means to a degree greater than the strength of said spring.

4. A fluid pressure actuator as set forth in claim 3 which comprises in addition, means to mechanically connect said members to manually move said element after a predetermined movement of the manually operable member relative to the other member has occurred.

References Cited in the file of this patent

UNITED STATES PATENTS

| 1,803,314 | Bragg | May 5, 1931 |
| 1,831,737 | Broussouse | Nov. 10, 1931 |
| 1,856,342 | Kratz | May 3, 1932 |
| 1,972,330 | Davis | Sept. 4, 1934 |
| 2,002,315 | Furgason | May 21, 1935 |
| 2,229,247 | Kamenarovic | Jan. 21, 1941 |
| 2,413,380 | Rush | Dec. 31, 1946 |

FOREIGN PATENTS

| 320,435 | Great Britain | Oct. 17, 1929 |
| 747,273 | France | Mar. 28, 1933 |